United States Patent [19]
Anderson et al.

[11] Patent Number: 5,394,184
[45] Date of Patent: Feb. 28, 1995

[54] SURVEILLANCE ASSEMBLY HAVING CIRCUMFERENTIAL DELIVERY OF FORCED AIR TO VIEWING BUBBLE

[75] Inventors: Luis Anderson, Boca Raton; Norbert M. Stiepel, Palm Beach Gardens, both of Fla.

[73] Assignee: Sensormatic Electronics Corporation, Deerfield Beach, Fla.

[21] Appl. No.: 114,016

[22] Filed: Aug. 30, 1993

[51] Int. Cl.$^6$ ............................................. H04N 7/18
[52] U.S. Cl. .................................... 348/151; 348/211
[58] Field of Search ................ 348/151, 143, 373, 211; H04N 7/18

[56] References Cited
U.S. PATENT DOCUMENTS

| | | | |
|---|---|---|---|
| 4,320,949 | 3/1982 | Pagano | 354/81 |
| 4,337,482 | 6/1982 | Coutta | 348/151 |
| 4,414,576 | 11/1983 | Randmae | 358/229 |
| 4,485,407 | 11/1984 | Bohm et al. | 358/229 |
| 4,796,039 | 1/1989 | Pagano | 354/81 |
| 4,833,534 | 4/1989 | Paff et al. | 358/108 |
| 4,901,146 | 2/1990 | Struhs et al. | 348/151 |
| 5,121,215 | 6/1992 | Boers et al. | 348/373 |
| 5,181,120 | 1/1993 | Hickey et al. | 348/373 |
| 5,223,872 | 6/1993 | Stiepel et al. | 348/143 |

Primary Examiner—Tommy P. Chin
Assistant Examiner—Richard Lee
Attorney, Agent, or Firm—Robin, Blecker, Daley & Driscoll

[57] ABSTRACT

A surveillance assembly wherein a support housing and a cover member when joined form a space for receiving a camera and lens assembly and wherein a forced air delivery assembly is adapted to provide forced air to the cover member from points distributed about substantially the entire circumference of the cover member.

25 Claims, 5 Drawing Sheets

SURVEILLANCE ASSEMBLY HAVING CIRCUMFERENTIAL DELIVERY OF FORCED AIR TO VIEWING BUBBLE

BACKGROUND OF THE INVENTION

This invention relates to surveillance assemblies and, in particular, to surveillance assemblies which are adapted to accommodate environmental conditions.

Surveillance assemblies are known in which the surveillance assembly comprises a dome-shaped support housing to which is joined or attached a dome-shaped cover member or "bubble". The support housing and cover member define an enclosed space for receiving a camera and lens assembly which views outward of the surveillance assembly through the cover member. Usually, the camera and lens assembly is supported in the surveillance assembly so as to be rotational about a vertical axis for effecting a panning movement and to be pivotable about a horizontal axis to effect a tilting movement.

When the surveillance assembly is intended to be used in environments in which there are wide variations in temperature (as, for example, when it is to be used outdoors), various additions have been made to the assembly in an attempt to reduce any adverse effects which might result from the wide temperature changes. These additions have sought to cool the assembly to compensate for high environmental temperatures and to heat the assembly to compensate for low environmental temperatures. In this way, overheating of the electrical components of the assembly, fogging within the assembly and/or icing of the dome-shaped cover member are avoided.

A surveillance assembly having such compensation for environmental conditions is disclosed in U.S. Pat. No. 4,320,949. In a first embodiment of the surveillance assembly of the '949 patent, a thermostatically controlled fan is disposed in the side wall of the upper support housing. This fan provides forced air circulation in the housing to cool the housing when the temperature in the housing reaches a predetermined level. Also included in this embodiment of the surveillance assembly are thermostatically controlled heaters. The latter are brought into operation when the temperature in the housing approaches freezing so as to heat the air in the housing.

In a second embodiment of the surveillance assembly of the '949 patent, air is brought into the assembly by natural circulation. In this embodiment, a space or inlet area is provided at the interface of the support housing and cover member so that air can naturally enter the support housing about the circumference of the housing. This air is circulated downward adjacent the inner wall of the cover member and then proceeds upward into the support housing where it is exhausted through an air exhaust port.

Another surveillance assembly in which heating and cooling of the assembly is provided to compensate for environmental changes in temperature is disclosed in U.S. Pat. No. 4,984,089, assigned to the same assignee hereof. The surveillance assembly of the '089 patent attempts to improve on the above-discussed compensation system of the '949 patent.

In the assembly of the '089 patent, an air in-take valve and air exhaust valves are disposed in the side wall and top wall of the support housing, respectively. Exhaust fans are also disposed in the support housing for causing air to be exhausted from the assembly via the exhaust valves which are in the issuance paths of the exhaust fans.

A circulation fan and a heater unit are additionally included in the assembly in the area of the cover member. This fan provides forced air to the inner wall of the cover member through a slot in a shroud. The shroud is situated in front of the cover member and the slot in the shroud permits the camera and lens assembly to view outward of the surveillance assembly.

The surveillance assembly of the '089 patent is further provided with a control unit which provides control signals for the exhaust fans, circulation fan and heater assembly. The control unit causes continuous operation of the circulation fan and includes a thermostat circuit which provides first and second signals for operating the exhaust fan and heater assembly upon the occurrence of first and second temperatures.

While the aforesaid elements in the surveillance assembly of the '089 patent satisfactorily compensate for environmental temperature changes, the manner of compensation has certain limitations. First, at any particular time, forced air is directly applied only to the region of the inner wall of the cover member aligned with the slot in the shroud. As a result, a region of the inner wall which is removed from the slot may not receive an adequate amount of forced air until the camera and lens assembly and, hence, the slot in the shroud are actually aligned with the region. This could cause delay in viewing outward of the assembly if, for example, the region is found to be partially fogged or iced when the camera and lens assembly arrives at the region.

Secondly, the circulation fan and heater unit of the surveillance assembly of the '089 patent are mounted to a plate which carries the camera and lens assembly. This is necessary so that the forced air from these elements remains aligned with the slot in the shroud which is also attached to the plate so that the shroud moves with the camera and lens assembly. In some surveillance assembly arrangements, such as the arrangement disclosed in copending patent application U.S. Ser. No. 761,331 and issued U.S. Pat. No. 5,223,872, both of which are also assigned to the same assignee hereof, this is not practical due to size and power constraints.

It is, therefore, a primary object of the present invention to provide a surveillance assembly of the above-type which does not suffer from the above disadvantages.

It is a further object of the present invention to provide a surveillance assembly of the above-type in which compensation for environmental changes is more readily and easily carried out.

It is also an object of the present invention to provide a surveillance assembly of the above type meeting the above-stated objectives and which can better accommodate various configurations of the camera and lens assembly, including the camera and lens assembly of the '331 application and '872 patent.

SUMMARY OF THE INVENTION

In accordance with the principles of the present invention, the above and other objectives are realized in a surveillance assembly of the above-type which is adapted to include a forced air delivery assembly which delivers forced air to the inner surface of the cover member from points distributed around substantially the entire circumference of the cover member. The delivery assembly is further adapted so that the forced air can be controllably heated as it is delivered.

By delivering heated forced air from points around the entire circumference of the cover member, all regions of the inner wall of the cover member are heated substantially immediately. Fogging and condensation forming on the inner surface of the cover member and ice forming on the outer surface of the cover member can, therefore, be quickly removed or prevented. Also, the delivery assembly can be stationary and need not be moved with the movement of the camera and lens assembly. This makes the delivery assembly more adaptable for use with different configurations of the camera and lens assembly.

In the embodiment of the invention to be disclosed hereinafter, the forced air delivery assembly comprises a ring-shaped tube whose circumference follows that of the periphery of the cover member. The lower part of the wall of the ring-shaped tube has apertures distributed about the circumference of the tube so that air forced through the tube by a blower is delivered by these apertures about the circumference of the inner wall of the cover member. A heating element is also situated within the ring-shaped tube for providing controlled heating of the air being delivered.

Additionally, in the disclosed embodiment, similar to the '089 patent, air intake and exhaust valves are situated in the side wall and top wall, respectively, of the upper support housing and exhaust fans are attached to the support housing and issue air in the direction of the exhaust valves for cooling the upper housing. Also, similar to the '089 patent, a control unit controls the blower and heating element of the forced air delivery assembly and the exhaust fans such that the blower remains on, while thermostats in the control unit develop signals for controllably operating the exhaust fan and the heating element.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
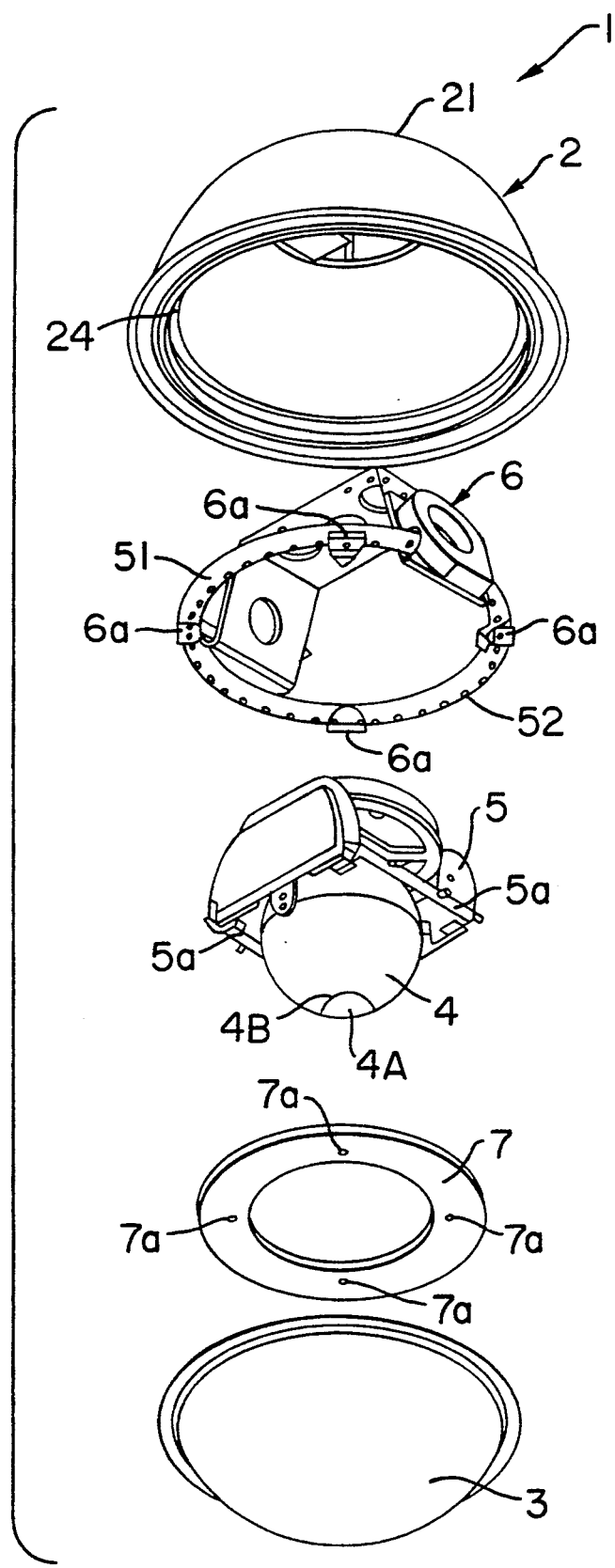
FIG. 1 illustrates an exploded view of a surveillance assembly in accordance with the principles of the present invention.

FIG. 1 shows an exploded view of a surveillance assembly 1 in accordance with the principles of the present invention. As shown, the assembly includes a dome-shaped upper member 2 comprised of an outer sunshield 21 and inner support housing 24. The assembly 1 further includes a lower cover member or bubble 3, also dome-shaped, which is made of a material which allows viewing outward or through the cover member. A ring-shaped skirt 7 fills the lateral space between the cover member 3 and the support housing 24, when the upper member 2 and cover member 3 are joined together to define an enclosed space.

Within this space is an eyeball assembly 4, which is carried by a carriage assembly 5 so as to be rotational about horizontal and vertical axes. The eyeball assembly 4 includes a camera and lens assembly 4A which views out of the eyeball assembly via a viewing aperture 4B and which rotates and pivots with the eyeball assembly.

The carriage assembly 5 includes mounting members 5a which enable the carriage assembly to be pivoted into locking engagement with mounting blocks 6a affixed to a forced air delivery assembly 6. The eyeball assembly 4 and carriage assembly 5 and the manner of pivoting the carriage assembly into locking engagement with the blocks 6a of the air delivery assembly 6 are of the type more fully described in the '331 patent application and '872 patent mentioned above and the teachings of which are incorporated herein by reference.

The forced air delivery assembly 6 is provided in the surveillance assembly 1 to permit the assembly to better compensate for environmental temperature changes. In particular, in accordance with the invention and as will be discussed more fully hereinbelow, the assembly 6 is adapted to deliver forced air from points distributed about substantially the entire (i.e., at least 330° or more of the) circumference of the cover member 3 so as to better compensate for the effects of temperature changes on the inner surface of the cover member.

Figure 2:
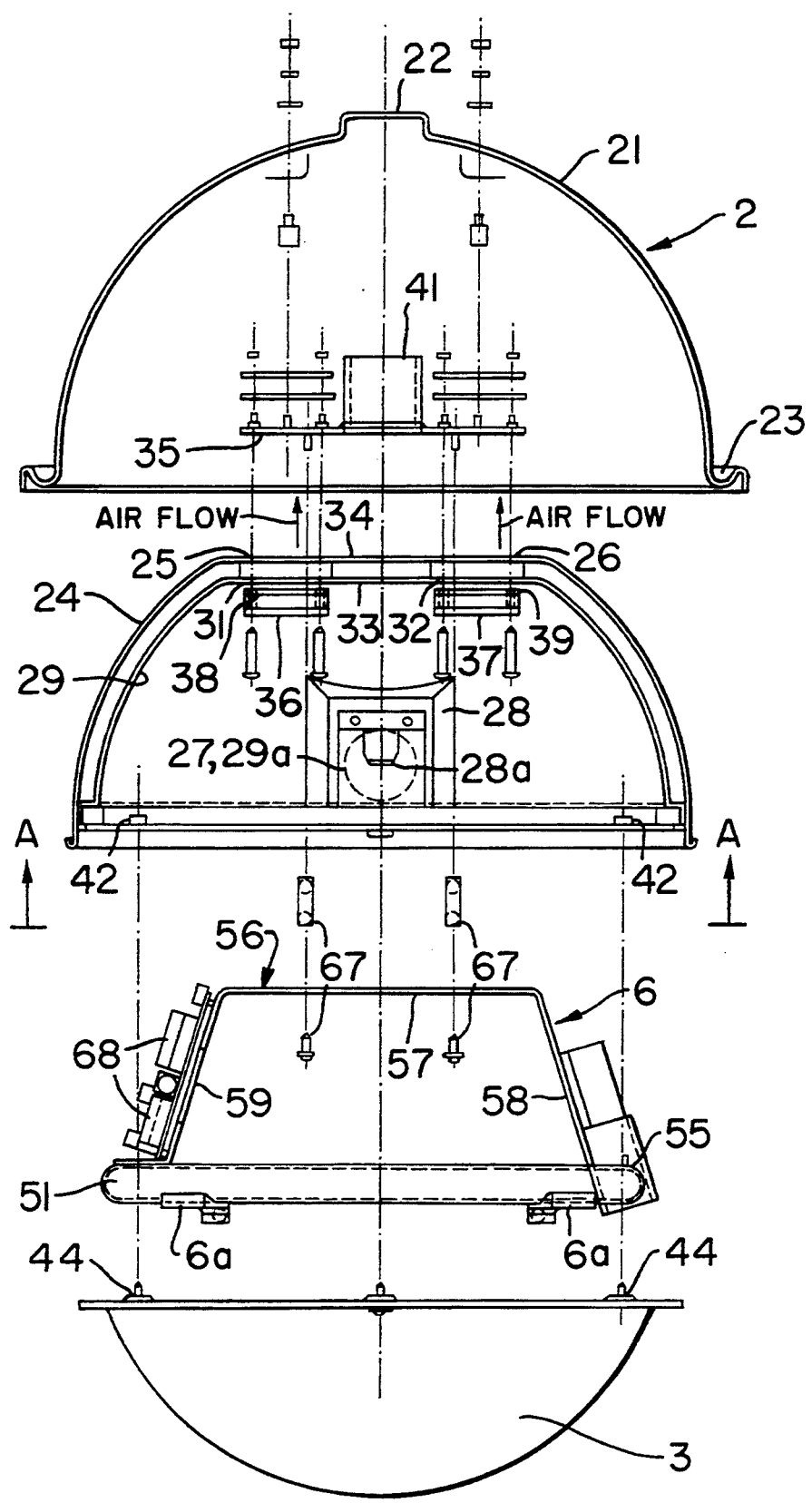
FIG. 2 illustrates a more detailed exploded view of certain of the components of the surveillance assembly of FIG. 1.

FIG. 2 shows a further exploded view of the surveillance assembly 1. In this view, the eyeball assembly 4 and carriage assembly 5 have been omitted, while the dome-shaped upper member 2 has been depicted in greater detail.

As shown, the upper member 2 is similar in construction to the upper member described in the '089 patent. The member 2 includes the previously mentioned outer sunshield 21 which has a central cable and mounting passage 22, adapted to receive an exteriorly threaded pipe fixture for supporting the housing, and a rain gutter 23. Housing 24, preferably comprised of metal, is situated interiorly of sunshield 21 and has upper openings 25 and 26 and a lower side opening 27. Facing the lower opening 27, affixed to the side of the housing 24, is an intake valve assembly 28. The assembly 28 includes a one-way intake valve 28a mounted in registry with opening 27.

An insulating liner 29 is disposed interiorly of housing 24 and has a side opening 29a in registry with the side opening 27 and upper openings 31 and 32 in registry with upper openings 25 and 26 in the housing 24. A further opening 33 is formed in liner 29 in registry with an opening 34 of the housing 24 which is in line with the opening 22 in the sunshield 21. The opening 33 is normally closed, being formed by cross-shaped slits in liner 29, to be forced open by movement of cabling therethrough, with the liner then sealing upon the cabling.

A support plate 35 is securable to housing 24 and sunshield 21 and has exhaust fans 36 and 37 secured thereto, one-way valves 38 and 39 being disposed in the issuance paths of fans 36 and 37, respectively. Plate 35 also includes a cable guide 41 projecting upwardly therefrom for disposition in passage 22 and includes other hardware, depicted but not otherwise described, for securement to sunshield 21 and for securement thereto of fans 36 and 37 and valves 38 and 39. Housing assembly 24 is also thereby secured to sunshield 21.

Figure 3:
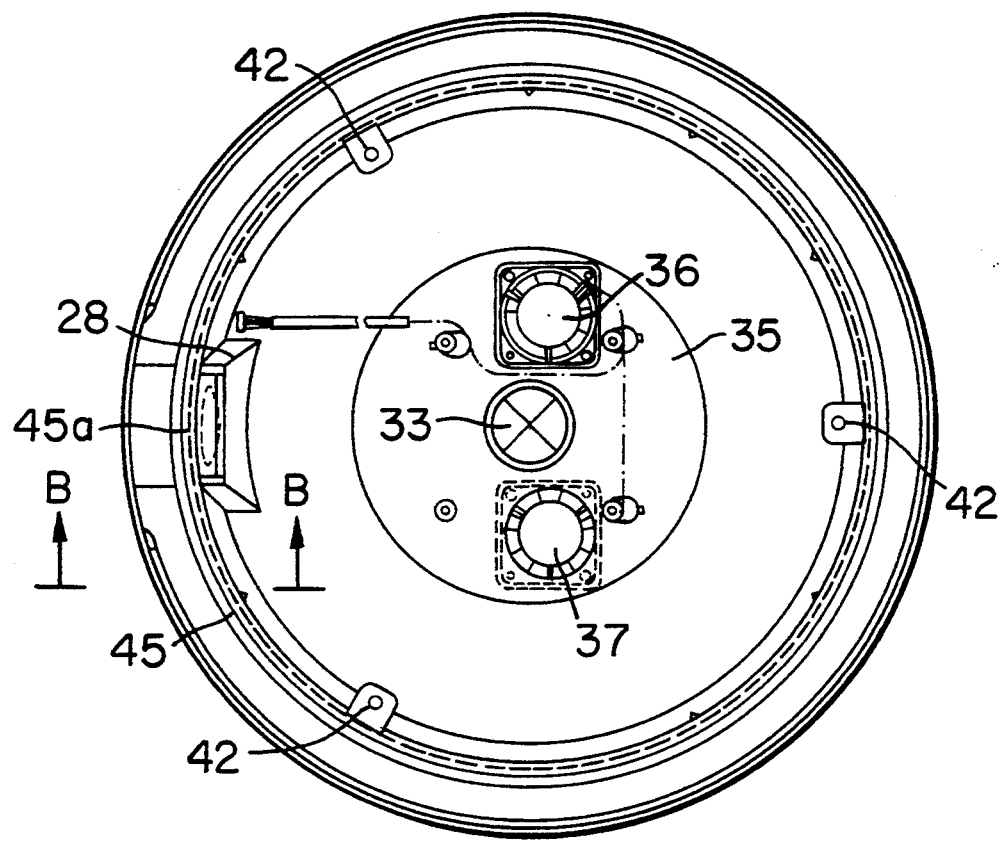
FIG. 3 illustrates a sectional view of the surveillance assembly of FIG. 1, taken along the line A—A of FIG. 2.

Housing 24 defines spaced joinder flanges 42 (see FIG. 3). Tamper resistance screws 44 are placed through openings in the cover member 3, pass through apertures 7a in the skirt 7 and are threaded into flanges 42 to secure the cover member 3 to the housing 24.

The valves 28a, 38 and 39 are preferably constituted by flappers constrained for flapping movement in only one direction, thereby providing the desired one-way flow activity. The valve 28a is normally closed by the flapper valve thereof except in the course of operation of fans 36 and 37.

Figure 4:
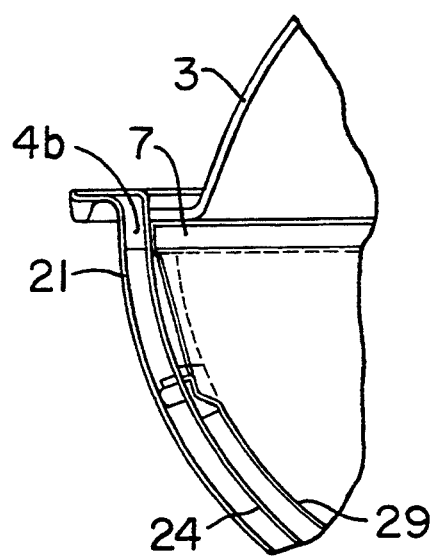
FIG. 4 illustrates a sectional view of the surveillance assembly of FIG. 1, taken along the line B—B of FIG. 3.

The valve assembly 28 communicates via the openings 27 and 29a with a segment 45a (see, FIG. 3) of a passageway 45 defined by the spacing between the sunshield 21 and housing 24. The region 45, in turn, communicates with the outside air environment via an outlet 4b, as can be best seen in FIG. 4.

As above-indicated, the aforesaid configuration and operation of the upper member 2 is the same as in the surveillance assembly of the '089 patent. However, as also above-indicated, in accordance with the invention, the surveillance assembly 1 further includes the forced air delivery assembly 6 for providing forced air from points distributed around substantially the entire circumference of the inner surface of the cover member 3.

Figure 5:
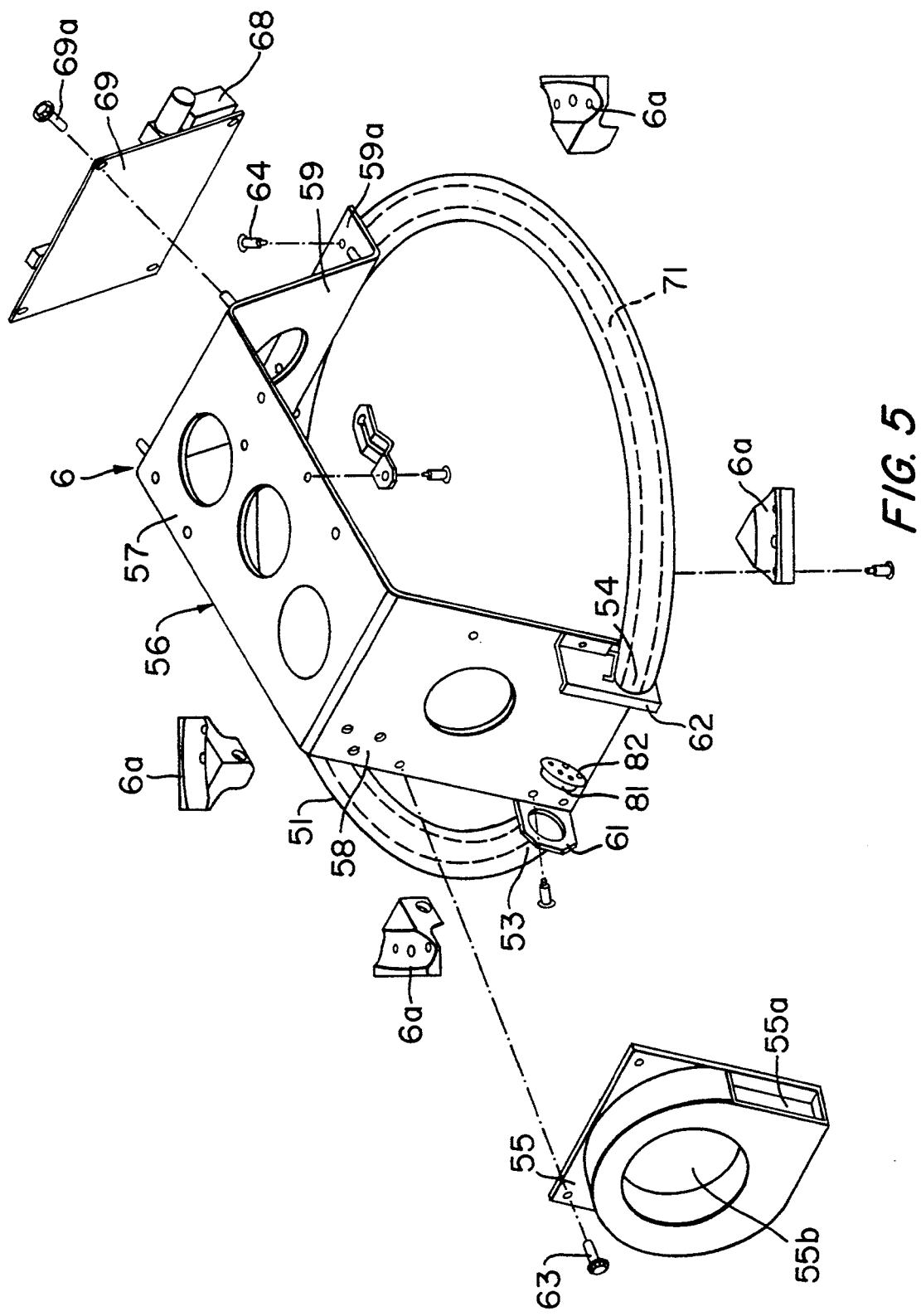
FIG. 5 illustrates an exploded view of the forced air delivery assembly of the surveillance assembly of FIG. 1.

As shown in FIGS. 1-2 and 5, the assembly 6 includes a ring-shaped tube 51 whose lower part has apertures 52 (see, FIG. 1) distributed about the circumference of the tube. The circumference of the tube follows that of the periphery of the cover member 3 and, in the present case, is circular to match the circular periphery of the cover member.

As will be discussed below, the apertures 52 in the ring-shaped tube 51 permit jets of air to emanate from the tube. These jets of air, in turn, provide forced air delivery to points distributed around substantially the entire circumference of the cover member. The location and configuration of the apertures 52 will depend upon the particular application and by changing the size and-/or distribution of the apertures various forced air delivery effects and/or air velocities can be realized.

As best seen in FIG. 5, the ring-shaped tube 51 has terminating ends 53 and 54, the first of which is closed by an apertured plug 81 and the second of which is open and serves as an air intake. The plug 81 is provided to control the back pressure for the forced air in the tube. The back pressure can be changed by selectively closing or opening the apertures 82 in the plug. Also, by appropriately controlling the back pressure, a constant air velocity for the jets of air emanating from the apertures 52 can be realized.

The apertures 82 in the plug 81 also serve to deliver forced air from the ring-shaped tube 51 against a wall of a blower 55 which is situated between the terminating ends 53 and 54 of the tube. This causes forced air to be delivered to the inner wall of the cover member below the blower, insuring that forced air is delivered from points distributed around substantially the entire circumference of the cover member.

The blower 55 has an air issuance port 55a for delivering forced air into the open end 54 of the ring-shaped tube 51. The blower also includes an air intake port 55b through which air in the upper housing 24 is carried into the blower.

The ring-shaped tube 51 and blower 55 are supported by a U-shaped bracket 56 having a yoke section 57 and arms 58 and 59. Mounted to the arm 58 on opposite sides of its lower end are mounting plates 61 and 62 of the ring-shaped tube 51. The plate 62 is connected to the end 54 of the tube 51 so that this end is open and can receive air from issuance port 55a of the blower 55. The blower is attached to the arm 58 via fasteners 63. The arm 59 of the bracket 56 includes a lower flange 59a to which a section of the ring-shaped tube 51 is attached via fasteners 64.

The yoke 57 of the bracket 56 is attached to the housing via fasteners 67 (see FIG. 2) which fasten to the plate 35 supporting the fans 36 and 37. A control unit 68 including a PC board 69 is attached by fasteners 69a to the arm 59 of the bracket 56.

Within the ring-shaped tube 51 is disposed a heating element 71, shown in dotted line in FIG. 5. This element is in strip form and extends about the circumference of the tube. Preferably, the element 71 is of a silicone pad type having nickel-chromium wire strips within the pad. This allows heat being provided around the circumference of the tube to be tailored as desired by situating more or less of the wire strips at different regions about the circumference. Typically, more of the wire strips will be situated at the end 53 of the ring-shaped tube 51, as this end tends to be cooled due to the presence of the blower 55. As a result, sufficient heat will be generated at the end 53 of the ring-shaped tube 51 to realize an even heat distribution about the entire circumference of the tube.

With the forced air delivery assembly 6 configured as above-described, the assembly can better compensate for environmental temperature changes and, in particular, can function to more easily and readily defog and de-ice the cover member 3. In particular, with the blower 55 on, air from inside the upper housing 24 of surveillance assembly 1, is drawn into the intake port 55b of the blower.

This air is then forcibly directed by the blower 55 out of the air issuance port 55a into the open end 54 of the ring-shaped tube 51. With the heating element 71 suitably energized, as the air passes through the tube, jets of heated air emanate downward from the apertures 52 distributed about the circumference of the tube. Also, jets of heated air emanate from the apertures 82 at the end of the tube and impinge on the bottom wall of the blower and are likewise directed downward.

These downward heated jets of air then forcibly impact on the inner surface of the cover member so that forced air is delivered to points distributed around substantially the entire circumference of the cover member. After the air hits the cover member, it travels down the inner surface of the member and collides with other downward heated air jets being delivered from the tube. The heated air thus mushrooms up around the eyeball 4 and through the center of the skirt 7 to the upper housing 24. The air is then recirculated by the blower 55.

As the downward heated air jets impinge on the inner surface of the cover member the inner surface is heated around its circumference. A constant air temperature is thus produced at the inner surface which prevents fogging and the accumulation of moisture. Moreover, forced convection transfers heat by conduction from the inner surface through the cover member to the outer surface of the cover member and prevents icing of the outer surface. The camera and lens assembly of the eyeball assembly can thus view outward of the cover member without adverse effects from fogging, ice or moisture accumulation.

Control of the blower 55, the heating element 71 and the fans 36 and 37 is carried out via the control unit 68. This control is such that the blower 55 is maintained on at all times, while the heating element 71 and fans 36 and 37 are selectively energized.

Figure 6:
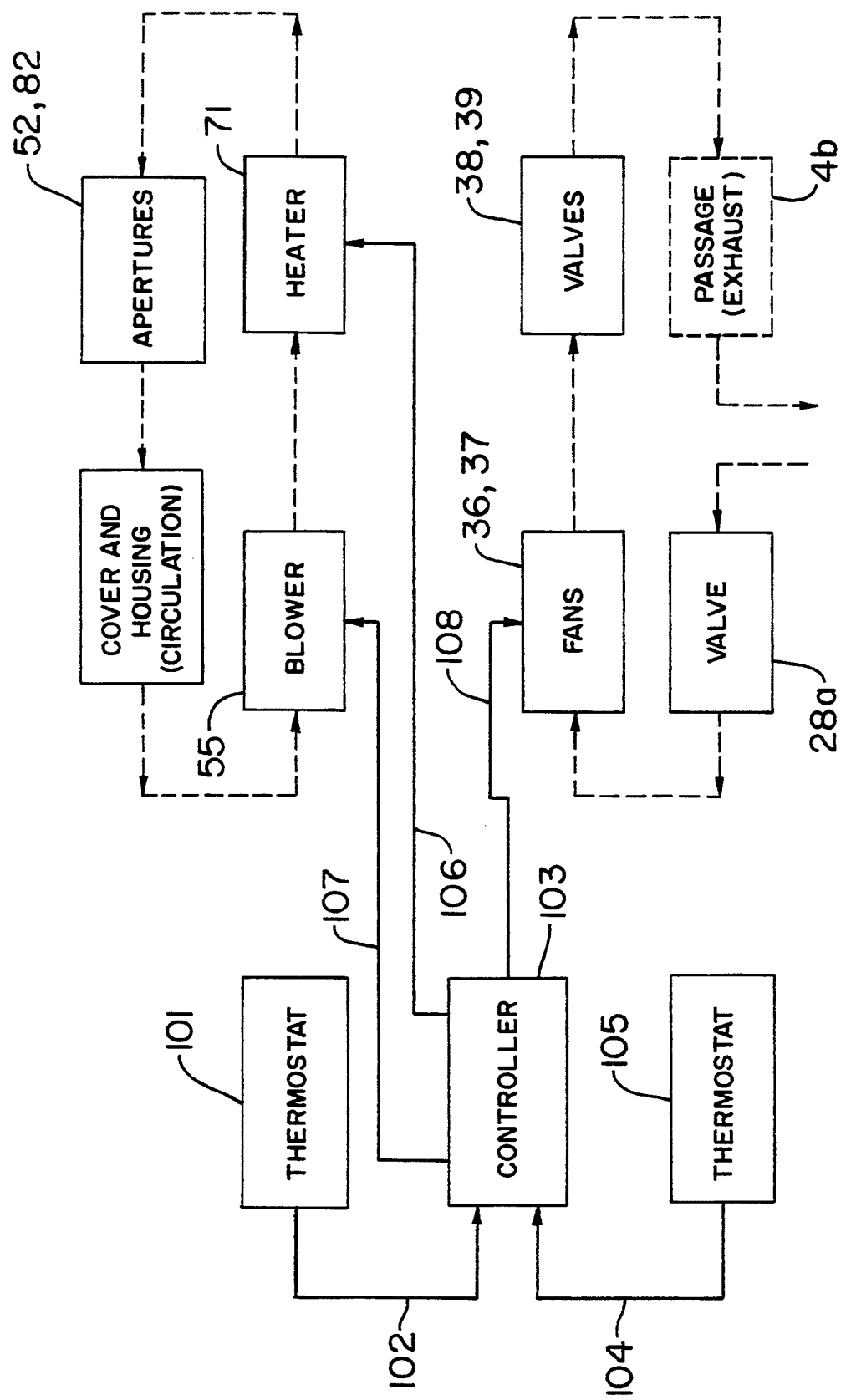
FIG. 6 is a functional block diagram of the control unit and other elements of the surveillance assembly of FIG. 1.

More particularly, the control unit 68 can be of the same construction and operate in the same manner as the control unit described in the '089 patent. FIG. 6 is a block diagram showing the control unit 68. As shown, the unit includes a thermostat 101 which is responsive to the detection of a predetermined low temperature within the support housing 24 to provide an output signal on line 102 to a controller 103. Controller 103 also receives an input signal on line 104 if a thermostat 105 detects a predetermined high temperature within the support housing.

Controller 103 is responsive to the line 102 input signal (low support housing temperature) to activate its output line 106, energizing heater 71. The controller 103 is operative at all times that the surveillance assembly is in use, to energize its output line 107, which energizes blower 55 thus on a continuous basis. In this heating mode of operation, as above-indicated, heated air is delivered through the apertures of the ring-shaped tube 51 onto the interior surface of cover member 3. This air prevents icing of the outer surface of the cover member and fogging of the inner surface and otherwise prevents moisture condensation thereon and in the interior of the surveillance assembly. In such heating mode, it will be understood that no negative pressure exists within the upper housing 24, whereby valve 28a is closed. Valves 38 and 39 are also closed since fans 36 and 37 are inoperative. Air flow is indicated in FIG. 6 by the broken lines, solid lines indicating electrical connections.

Controller 103 is responsive to the line 104 input signal (high support housing temperature) to activate its output line 108, energizing fans 36 and 37. Operation of the fans opens valves 38 and 39, and creates negative pressure within the upper housing 24, opening valve 28a. Ambient air thus flows from the outside through valve 28a, fans 36 and 37, valves 38 and 39 and exhaust passage 4b. Since valve 28a occupies only a limited portion of the periphery of the passage 4b, it will be seen that the air drawn into the support assembly 24 is largely environmental and quite little is recirculated.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. Thus, for example, the forced air delivery assembly 6 can be used with surveillance assemblies 1 which employ camera and lens assemblies other than those used with the eyeball assembly 4.

What is claimed is:

1. A surveillance assembly for use in combination with a camera and lens assembly comprising:
   a support housing;
   a cover member supported by said support housing and extending about a periphery of said support housing to define an enclosed area for receiving said camera and lens assembly, said cover member permitting viewing by said camera and lens assembly outward of said cover member when said camera and lens assembly is received within said enclosed area;
   and a forced air delivery assembly situated adjacent to said cover member for delivering forced air to said cover member from points distributed around substantially the entire circumference of said cover member, said forced air delivery assembly comprising: a ring-shaped tube having an air intake opening and apertures distributed about the circumference of said ring-shaped tube; a heating element disposed in said ring-shaped tube; and a blower for delivering forced air into said air intake opening of said ring-shaped tube.

2. A surveillance assembly in accordance with claim 1, wherein:
   said delivery of said forced air by said forced air delivery assembly is from points distributed at least around 330° of the circumference of said cover member.

3. A surveillance assembly in accordance with claim 1, wherein:
   the distribution and/or size of said apertures is controlled to control the velocity of air emanating from said apertures.

4. A surveillance assembly in accordance with claim 1, wherein:
   said cover member is dome-shaped and has a periphery which is adjacent the periphery of said support housing.

5. A surveillance assembly in accordance with claim 4, wherein:
   said support housing is dome-shaped.

6. A surveillance assembly in accordance with claim 1, further comprising:
   support means attached to said ring-shaped tube;
   and said camera and lens assembly supported by said support means.

7. A surveillance assembly in accordance with claim 6, wherein:
   said support means comprises first and second blocks, said first block including a pivot means, and said second block including an engagement means;
   and said surveillance assembly further comprises means for attaching said camera and lens assembly to said support means including: an eyeball assembly in which is housed said camera and lens assembly; and a carriage assembly for supporting said eyeball assembly such that said eyeball assembly can be rotated about a horizontal axis and pivoted about a vertical axis, said carriage assembly including means for pivotally engaging said pivot means of said first block of said support means so as to permit said carriage assembly to be pivoted to a preselected position and receiving means for receiving said engagement means of said second block of said support means as said carriage assembly is pivoted to said preselected position.

8. A surveillance assembly in accordance with claim 1, wherein:
   said ring-shaped tube includes means arranged at one end of said ring-shaped tube for controlling a back pressure for the air in said ring-shaped tube.

9. A surveillance assembly in accordance with claim 8, wherein:

said means for controlling said back pressure controls said back pressure such that the air emanates from said apertures at a constant velocity.

10. A surveillance assembly in accordance with claim 8, wherein:
said means for controlling said back pressure comprises a plug at said one end of said tube, said plug having apertures which can be selectively opened or closed to change said back pressure.

11. A surveillance assembly in accordance with claim 1, wherein:
said heating element is in strip form.

12. A surveillance assembly in accordance with claim 11, wherein:
said heating element is of a silicone pad type.

13. A surveillance assembly in accordance with claim 12, wherein:
said pad carries wires which are arranged to provide a uniform heat distribution about the circumference of said ring-shaped tube.

14. A surveillance assembly in accordance with claim 1 further comprising:
intake valve means supported in said support housing for permitting air to be taken into said support housing;
exhaust fan means supported by said support housing;
and exhaust valve means supported in an issuance path of said exhaust fan means for permitting air to be exhausted from said support housing.

15. A surveillance assembly in accordance with claim 14 further comprising:
control means for controlling said blower and said heating element of said forced air delivery assembly and said exhaust fan means.

16. A surveillance assembly in accordance with claim 15, wherein:
said control means controls said blower to remain on and controls said heating element and said exhaust fan to selectively remain on depending on temperature.

17. A surveillance assembly in accordance with claim 1, wherein:
said ring shaped tube has first and second spaced facing ends, said first spaced facing end being substantially closed except for at least an aperture and said second spaced facing end being substantially open and serving as said air intake opening of said ring-shaped tube;
and said blower is arranged between said first and second spaced facing ends of said ring-shaped tube and has an air issuance port facing said second spaced facing end of said ring-shaped tube so that air is forced by said blower into said ring-shaped tube;
said apertures distributed about the circumference of said ring-shaped tube causing said forced air in said ring-shaped tube to be ejected as jets of air toward the inner surface of said cover member and said at least one aperture in said first spaced facing end of said ring-shaped tube causing said air to be ejected as a jet of air at said blower which deflects said air toward the inner surface of said cover member, whereby said forced air is delivered from points distributed substantially about the entire circumference of said cover member.

18. A surveillance assembly in accordance with claim 17, wherein:
said first spaced facing end of said ring-shaped tube includes a plug having said aperture at said first spaced facing end of said ring-shaped tube.

19. A surveillance assembly in accordance with claim 17, further comprising:
said camera and lens assembly arranged to be supported by said support housing.

20. A surveillance assembly in accordance with claim 17, further comprising:
means for controlling said blower and said heating element.

21. A surveillance assembly in accordance with claim 20, wherein:
said control means controls said blower to remain on and controls said heating element to selectively remain on depending upon temperature.

22. A surveillance assembly in accordance with claim 17 further comprising:
a U-shaped support bracket having a yoke part and first and second legs extending from said yoke part, said U-shaped support bracket being attached to said support housing at said yoke part;
said first and second legs of said U-shaped support bracket supporting and being attached to said ring-shaped tube.

23. A surveillance assembly in accordance with claim 22, wherein:
said first and second ends of said ring-shaped tube are attached to said first leg of said U-shaped support bracket in spaced relationship;
and said blower is attached to said first leg of said U-shaped support bracket between said first and second ends of said ring-shaped tube.

24. A surveillance assembly in accordance with claim 23 further comprising:
support means attached to said ring-shaped tube;
and said camera and lens assembly attached to said support means.

25. A surveillance assembly in accordance with claim 24 wherein:
said support means comprises first and second blocks, said first block including a pivot means, and said second block including an engagement means;
and said surveillance assembly further comprises means for attaching said camera and lens assembly to said support means including: an eyeball assembly in which is housed said camera and lens assembly; and a carriage assembly for supporting said eyeball assembly such that said eyeball assembly can be rotated about a horizontal axis and pivoted about a vertical axis, said carriage assembly including means for pivotally engaging said pivot means of said first block of said support means so as to permit said carriage assembly to be pivoted to a preselected position and receiving means for receiving said engagement means of said second block of said support means as said carriage assembly is pivoted to said preselected position.

* * * * *